(12) United States Patent
Ramalingam et al.

(10) Patent No.: US 9,595,134 B2
(45) Date of Patent: Mar. 14, 2017

(54) METHOD FOR RECONSTRUCTING 3D SCENES FROM 2D IMAGES

(71) Applicant: Mitsubishi Electric Research Laboratories, Inc., Cambridge, MA (US)

(72) Inventors: Srikumar Ramalingam, Cambridge, MA (US); Yuichi Taguchi, Arlington, MA (US); Jaishanker K Pillai, Palo Alto, CA (US); Dan J Burns, Wakefield, MA (US); Christopher Reed Laughman, Waltham, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 519 days.

(21) Appl. No.: 13/892,263

(22) Filed: May 11, 2013

(65) Prior Publication Data

US 2014/0333615 A1    Nov. 13, 2014

(51) Int. Cl.
*G06T 17/00*    (2006.01)
*G06T 7/00*    (2006.01)

(52) U.S. Cl.
CPC ............ *G06T 17/00* (2013.01); *G06T 7/0061* (2013.01); *G06T 7/0063* (2013.01); *G06T 2210/04* (2013.01)

(58) Field of Classification Search
CPC ................................ G06T 17/20; G06T 19/00
USPC ........................................................ 345/420
See application file for complete search history.

(56) References Cited

U.S. PATENT DOCUMENTS 5,373,987 A * 12/1994 Corabatir .................... 236/49.3
2011/0025689 A1 * 2/2011 Perez et al. .................. 345/420

OTHER PUBLICATIONS

Schwing, A.G., Hazan, T., Pollefeys, M., Urtasun, R.: Efficient Structured Prediction for 3D Indoor Scene Understanding. In: Proc. CVPR (2012).*
Vouzounaras G, Daras P, Strintzis M (2011) Automatic generation of 3D outdoor and indoor building scenes from a single image. Multimedia Tools Appl.*
David L. Waltz, Generating Semantic Descriptions From Drawings of Scenes With Shadows, MIT Artificial Intelligence Laboratory, 1972.*
Floros, G., Leibe, B.: Joint 2D-3D temporally consistent semantic segmentation of street scenes. In: IEEE Conference on Computer Vision and Pattern Recognition (2012).*

(Continued)

*Primary Examiner* — Devona Faulk
*Assistant Examiner* — Jin Ge
(74) *Attorney, Agent, or Firm* — Gene Vinokur; James McAleenan; Hironori Tsukamoto

(57) ABSTRACT

A method reconstructs at three-dimensional (3D) real-world scene from a single two-dimensional (2D) image by identifying junctions satisfying geometric constraint of the scene based on intersecting lines, vanishing points, and vanishing lines that are orthogonal to each other. Possible layouts of the scene are generated by sampling the 2D image according to the junctions. Then, an energy function is maximized to select an optimal layout from the possible layouts. The energy function use's a conditional random field (CRF) model to evaluate the possible layouts.

21 Claims, 11 Drawing Sheets

(56) References Cited

OTHER PUBLICATIONS

DeskShare, Setting up a PC video surveillance system, Oct. 6, 2012, http://www.deskshare.com/resources/articles/wcm_setup_pcvideosurveillancesystem.aspx.*

Oscar Ripolles, José E. Simó• Gines Benet, Roberto Vivó, "Smart video sensors for 3D scene reconstruction of large infrastructures", Multimedia Tools and Applications, Jul. 25, 2012.* iRobot Vacuum Cleaning Robot, 700 series Owner's Manual, 2010-2011.*

James McNeill, Jean Hertzberg, Zhigiang (John) Zhai, "Experimental Investigation of Operating Room Air Distribution in a Full-Scale Laboratory Chamber Using Particle Image Velocimetry and Flow Visualization", Journal of Flow Control, Measurement & Visualization, 2013, 1, 24-32, Published Online Apr. 2013.*

Hedau, V., Hoiem, D., Forsyth, D.: Thinking Inside the Box: Using Appearance Models and Context Based on Room Geometry. In: Daniilidis, K., Maragos, P., Paragios, N. (eds.) ECCV 2010, Part VI. LNCS, vol. 6316, pp. 224-237. Springer, Heidelberg (2010).*

Rother C (2002) A new approach to vanishing point detection in architectural environments. Image Vis Comput 20(9-10):647-655.*

S. Friedman, H. Pasula, and D. Fox. Voronoi random fields: Extracting topological structure of indoor environments via place labeling. In Int'l Joint Conf. on Artificial Intelligence, pp. 2109-2114, 2007.*

Miguel Cazorla & Francisco Escolano, "Feature Extraction and Grouping for Robot Vision Tasks", Cutting Edge Robotics,ISMB 3-86611-038-03, pp. 784, Germany, Jul. 2005.*

V. Hedau, D. Hoiem, and D.A. Forsyth, "Recovering the Spatial Layout of Cluttered Rooms," IEEE International Conference on Computer Vision, 2009.

D. Hoiem, A.A. Efros, and M. Hebert, "Recovering Surface Layout from an Image," International Journal of Computer Vision. vol. 75, No. 1, Oct. 2007.

David C. Lee, Abhinav Gupta, Martial Hebert, and Takeo Kanade. "Estimating Spatial Layout of Rooms using Volumetric Reasoning about Objects and Surfaces." Advances in Neural Information Processing Systems 24 (NIPS) 2010.

Ashutosh Saxena, Sung H. Chung, Andrew Y. Ng. "3-D Depth Reconstruction from a Single Still Image," International Journal of Computer Vision (IJCV), vol. 76, No. 1, pp. 53-69, Jan. 2008.

* cited by examiner

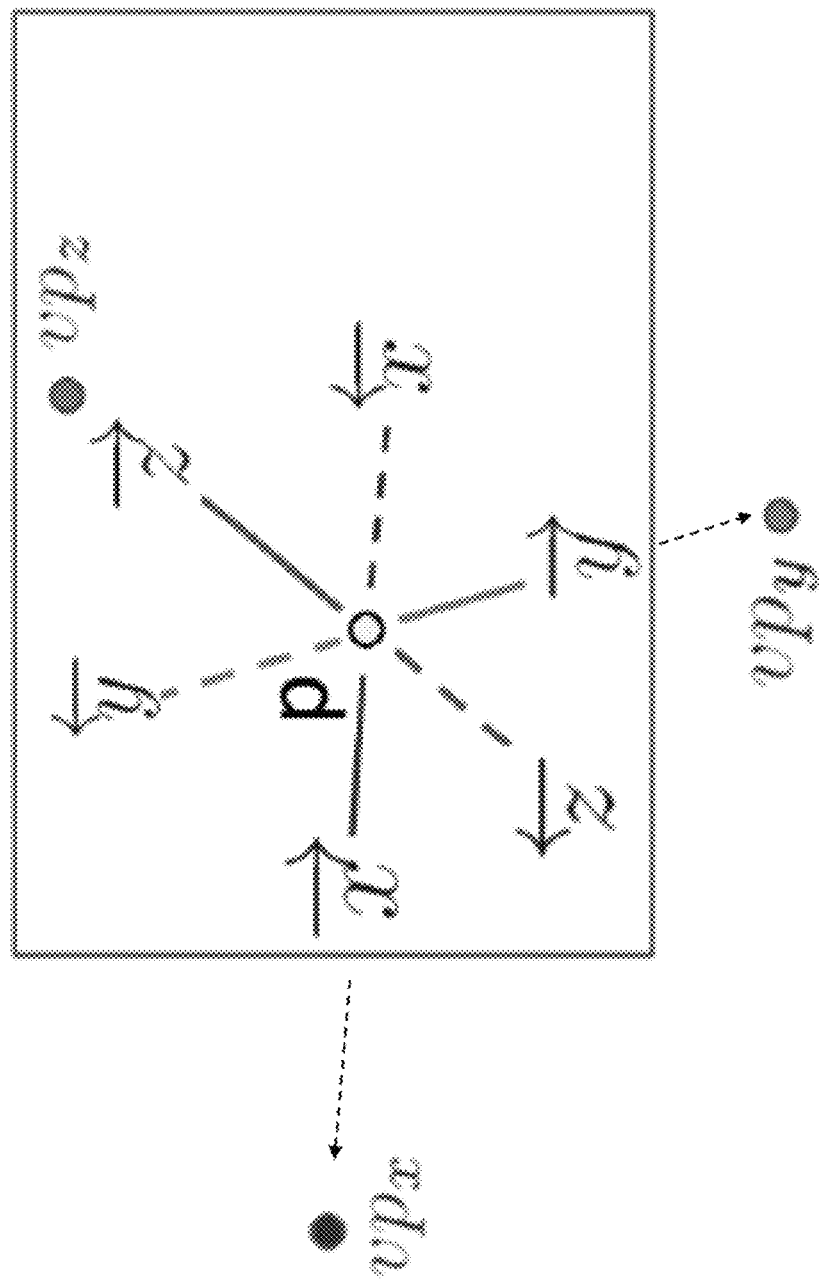

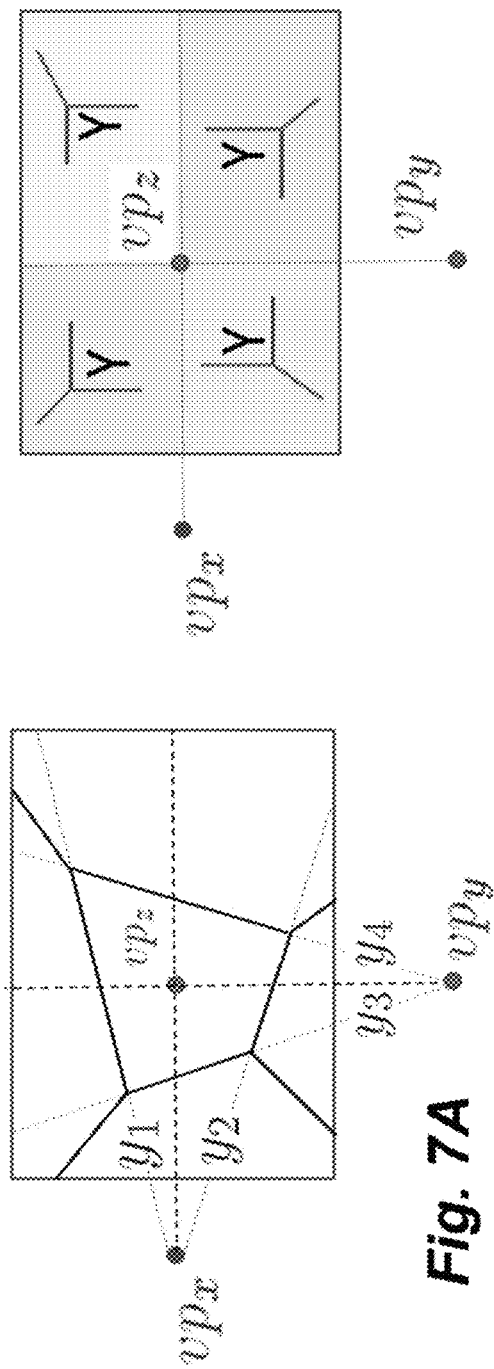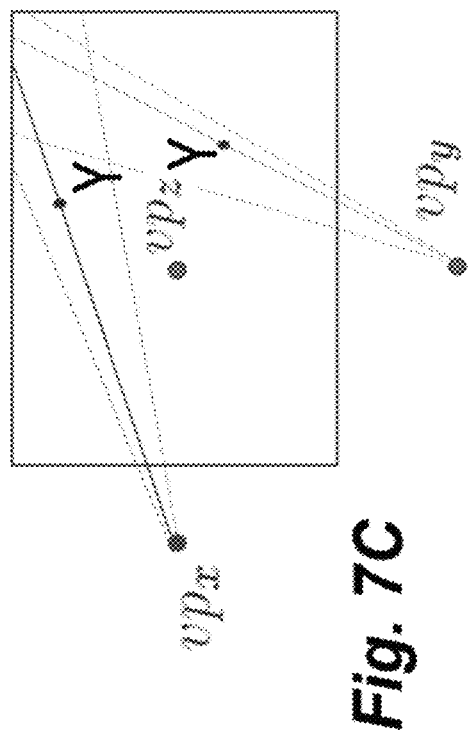
Fig. 7B
Fig. 7C
Fig. 7A

METHOD FOR RECONSTRUCTING 3D SCENES FROM 2D IMAGES

FIELD OF THE INVENTION

This invention relates generally to computer vision, and more particularly to reconstruct three dimensional scenes from two-dimensional images.

BACKGROUND OF THE INVENTION

Reconstructing 3D scenes from 2D images is a very important problem in computer vision and other imaging applications. Conventional 3D reconstruction methods typically use two or more images to obtain depths in the scene. However, depth recovery from a single 2D imago is a severely ill-posed problem. Rather than reconstructing a 3D scene using geometric entities, such as points and polygons, one method uses a 3D reconstruction procedure that constructs a popup model. Using several image and geometric features, that method automatically classifies regions as ground, buildings and sky. Another method infers absolute depth using image features and weak assumptions based on coplanarity and connectivity constraints.

For modeling indoor scenes, one method uses a cuboid model to approximate geometry of a room. With that model, pixels in an image are classified as left wall, middle wall, right wall, floor and ceiling. For indoor scenes, we refer to this classification as the indoor scene layout estimation or just layout estimation. To estimate the optimal layout, hundreds of cuboids are sampled and each cuboid is assigned a score based on several image and geometric features. We refer to this cuboid estimation problem as layout estimation. That method uses training images to classify texture, color and line features to obtain the pixel-level classification.

SUMMARY OF THE INVENTION

The embodiments of the invention provide a method for reconstructing a 3D scene from a single 2D image. Reconstructing a 3D real-world scene from a single 2D image is a very important and largely unsolved problem that could be used by numerous computer vision applications that are interested in a low cost single camera solution. The primary focus of the invention is to reconstruct indoor scenes. However, the method can also be used to reconstruct outdoor scenes when appropriate constraints based on prior geometric, knowledge of the scene are satisfied.

It is noted that real-world scenes are more difficult than artificial 3D scenes such as the ones generated by computer graphics or computer aided design. In the later, the methods are generally constrained beforehand. Scenes in the real-world are innumerable and difficult to classify, and constraints can only be inferred.

In an offline preprocessing stage, training images are used to identify features associated with vanishing points and lines that are orthogonal to each other in 3D space along X, Y or Z directions. During training, several positive and negative examples for cuboid layouts and their corresponding features are used. Given the true layout and possible hypothesis, a classifier learns to maximize the score of the layouts.

The lines in the image can be detected using procedures known in image processing, machine vision and computer vision. AU vanishing lines in a specific direction terminate at vanishing points, e.g., $vp_x$, $vp_y$ and $vp_z$. The vanishing lines and points are concepts in projective geometry. The training images are used to construct a classifier based on texture, color and line features to enable pixel-level classification. Then, the trained classifier can be used to label each pixel according different regions, e.g., left wall, right wall, front wall, floor, ceiling and choler.

The reconstruction method according to the embodiments uses novel geometric constraints, and associated optimization procedure to improve the pixel-level classification and possible layout of the scene. For indoor scenes, it is assumed that the layouts of rooms are box-like (rectangular) and concave. For outdoor scenes, the layout is generally convex.

In our invention we use junction features to reconstruct the 3D scene. The junctions are points, e.g., pixels in the 2D image, at which two or more lines intersect. Depending on the number and orientations of incident lines, the junctions can be classified as L, K, T, X, Y, W.

The method implicitly uses the following constraints: an ordering constraint, a connectivity constraint, a vanishing point constraint, a planarity constraint, and a boundary constraint The ordering constraint refers to a rule that, for example, a pixel classified as being in the ceiling region should always be located above a pixel classified as belonging to the floor regions after taking care of the camera orientation using vanishing points. Other ordering rules can be incorporated, for example, for outdoor scenes including, e.g., buildings, roofs of the buildings are above ground level.

The connectivity constraint refers to a rule that a single region is associated with a single connected set of pixels. That is, the set of pixels for the left wall are disjoint from the pixels of the right wall or floor. This rule is equally applicable for indoor and outdoor scenes.

The vanishing point constraint refers to a rule that lines separating different regions passes through the associated vanishing points.

The planarity constraint refers to a rule that planes corresponding to different faces of the room should favor junctions along its orientations. We detect junctions using multiple vanishing points. The method uses local planarity constraints based on junctions to force pixels lying on a plane to have the same labeling.

The boundary constraint refers to a rule that the boundary lines of the layout should contain many junctions like Y and W that are dominant on boundaries of the layout.

Theoretically, eight lines are needed to specify the layout of a room. However, we use a minimal number of four lines that can be used to uniquely obtain a layout. The other lines of the cuboid layout can be inferred or determined using the knowledge of the vanishing points.

The method also provides an efficient voting-based procedure to identify intersecting lines as junctions. The junctions are used for estimating the layout using a conditional random field (CRF) model and an energy function. In image processing, energy is typically related to the amount of useful information in an image.

Thus, the embodiments include the novel geometric constraints based on the junctions, the CRF-based energy function for estimating the layout of the scene. All the five geometrical constraints are incorporated in the energy function of CRF model and the maximization of the energy function tries to satisfy these constraints in identifying the best possible layout.

Some of the embodiments can use the optimal layout to feedback to household appliances, surveillance applications, people tracking systems, entertainment and heating, ventilation and air-conditioning (HVAC) systems.

BRIEF DESCRIPTION OF THE DRAWINGS

FIG. 5B is a schematic of different subsets of lines for junctions according to embodiments of the invention;

FIGS. 7A, 7B and 7C is a schematic of junctions based layouts according to embodiments of the invention;

DETAILED DESCRIPTION OF THE PREFERRED EMBODIMENTS

Figure 1A:
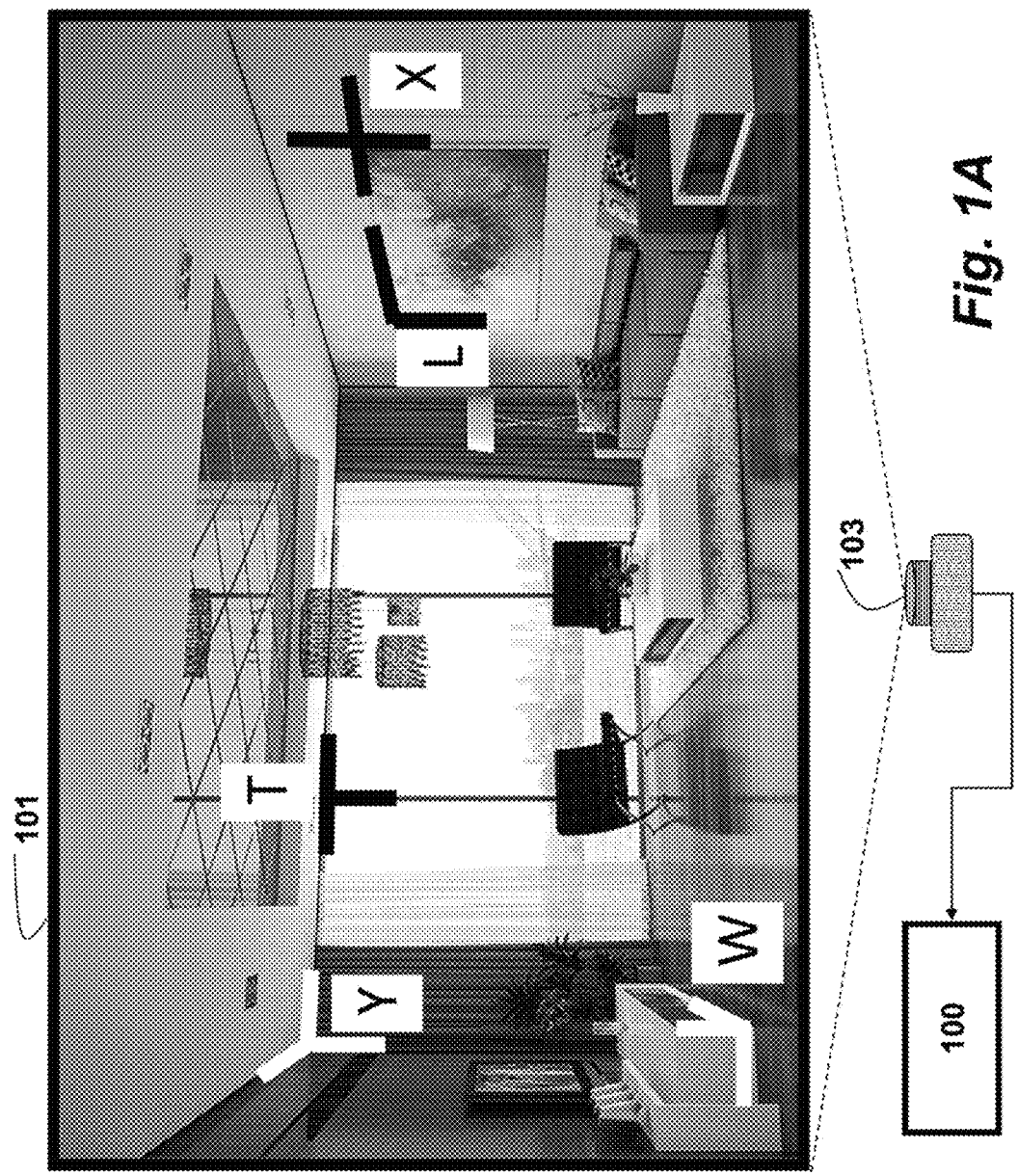
FIG. 1A is a 2D image of a scene processed by a reconstruction method according to embodiments of the invention.

The embodiments of our invention provide a method 100 for reconstructing a three-dimensional (3D) scene from a single two-dimensional image 101 such as shown in FIG. 1A. The image can be acquired by a monocular camera 103. We prefer a wide-angle camera to observe as much of the scene as possible.

FIG. 1A shows an image 101 of an indoor scene, e.g., a living room. Such man-made structures predominantly contain a large set of lines. Two or more lines intersect at different points. We call these intersections "junctions." Based on the patterns formed by the lines, we classify the junctions as K, L, T, W, X and Y, junctions.

The types and locations of these junctions provide geometric cues about the scene. For example, the four corners of the room form Y junctions. The L, T and X junctions generally occur on planar surfaces, such as a wall, a ceiling, or a floor. The W junctions are common on the bottom of furniture boundaries and do not frequently appear on the walls and ceiling. Our method identifies these junctions in a 2D image, and uses the junctions to reconstruct the 3D scene.

Reconstruction Method

Figure 1B:
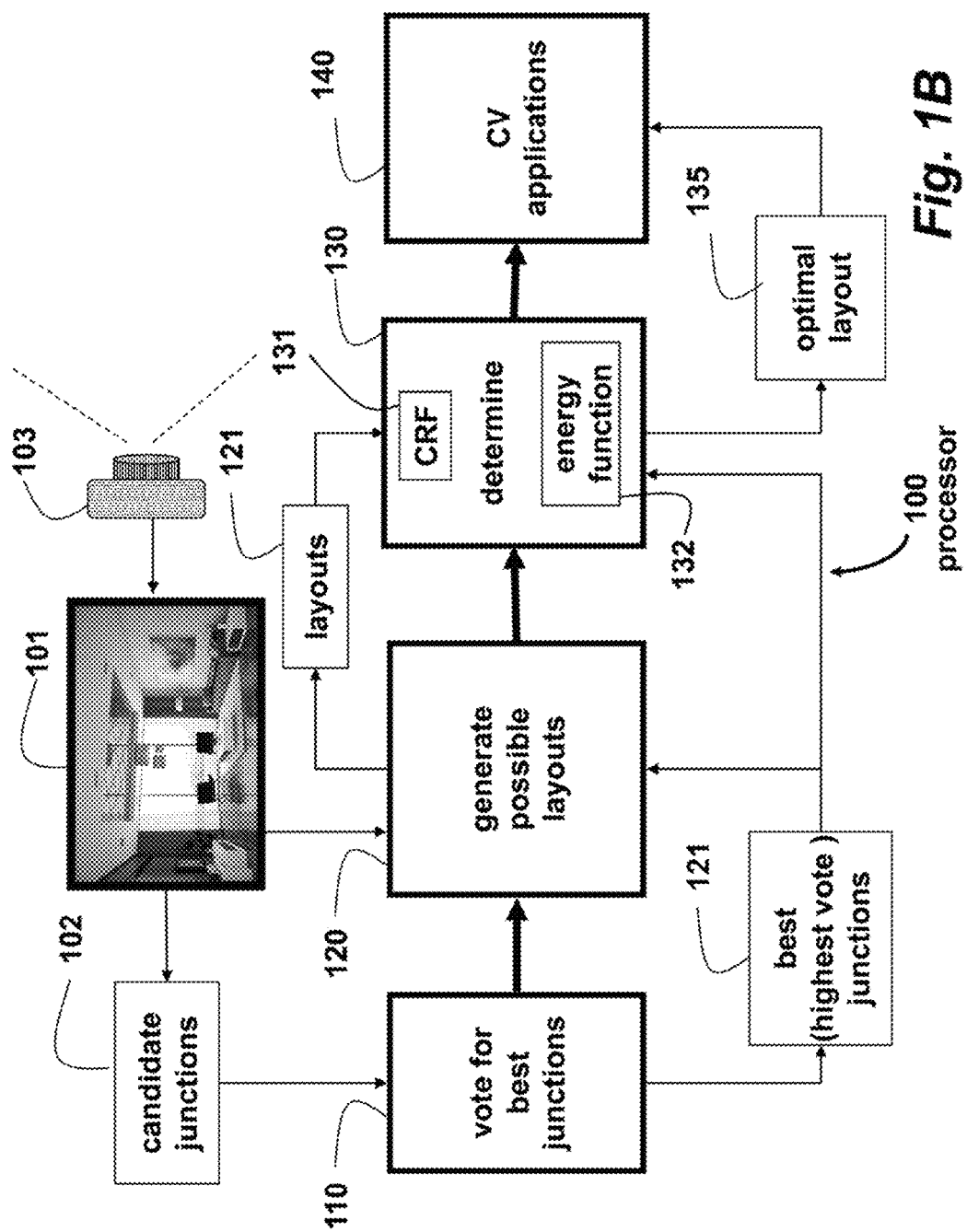
FIG. 1B is a flow chart of the method of FIG. 1A according to embodiments of the invention.

FIG. 1B shows the method 100 of FIG. 1 for reconstructing the 3D scene in the 2D image 101 in greater detail. First, we identify lines, vanishing points, e.g., vpx, vpy and vpz, and cluster the lines that potentially can form candidate junctions 102. The junctions are used by a voting procedure 110 to identify best (most likely) junctions 121.

Based on the best junctions, possible layouts 121 of the scene are generated 120 using junction based sampling. The possible layouts are used to determine 130 an optimal layout 135 of the 3D scene. The possible layouts are processed using a conditional random field (CRF) model 131 and an energy function 132 that is maximized. The energy function 132 also uses the most likely junctions 121. For indoor scenes, it can be assumed that possible layouts for rooms are most likely box-like (rectangular) and concave.

The CRF model includes a graph. The graph is constructed using the junctions and the possible layouts. The energy function is based on all possible junctions. The CRF and energy function can be trained using training images and a structured support vector machine (SVM). The training can be done offline in a preprocessing step. The layout can be used by any number of computer vision applications 140.

The steps of the above method 100 can be performed, in a processor connected to memory and input/output interfaces as known in the art. The above steps and other elements and features of the invention are now described in greater detail.

Constraints

The reconstruction method according to the embodiments implicitly uses a number of geometric constraints for pixel-level classification and possible layouts of the scene. The method uses five pixel-wise constraints: an ordering constraint, a connectivity constraint, a vanishing point constraint, a planarity constraint and a boundary constraint. The ordering constraint refers to a rule that, for example, a pixel classified as being in the ceiling region should always be located above a pixel classified as belonging to the floor regions after taking care of camera orientation using vanishing points. Other ordering rules can be incorporated, for example, for outdoor scenes including, e.g., buildings, roofs of the buildings are above ground level. The connectivity constraint refers to a rule that a single region is associated with a single connected set of pixels. That is, the set of pixels for the left wall are disjoint from the pixels of the right wall or floor. This rule is equally applicable for indoor and outdoor scenes. The vanishing point constraint refers to a rule that lines separating different regions passes through the associated vanishing points. The method also uses local planarity constraints based on detected junctions to force pixels lying on a plane to have the same labeling. The boundary constraint refers to the rule that boundary of the layout contains junctions such as Y and W. Out constraints significantly reduce the solution space. In other words, we only need to evaluate pixels in the 2D image that satisfy the geometric constraints in six directions (+x, −x, +y, −y, +z and −z), instead of all directions as the prior art. This can speed up processing by as much as two orders of magnitude.

Junction Identification

Figure 2:
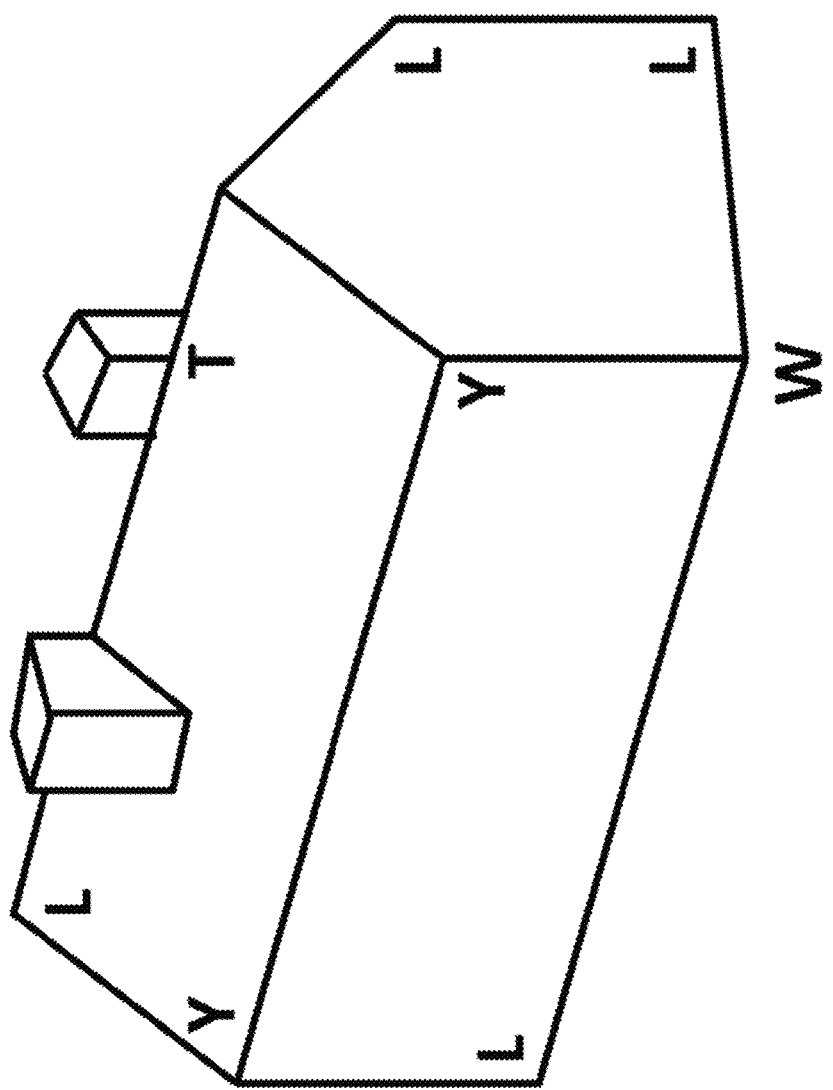
FIG. 2 is a synthetic line drawing of an outdoor scene.

FIG. 2 is a simplified line drawing of an outdoor scene. In real-world scene, missing and spurious lines are possible. We identify the junctions, classify their types, and use the junctions to estimate the geometry or layout of the scene. Some example junctions are shown.

Figure 3:
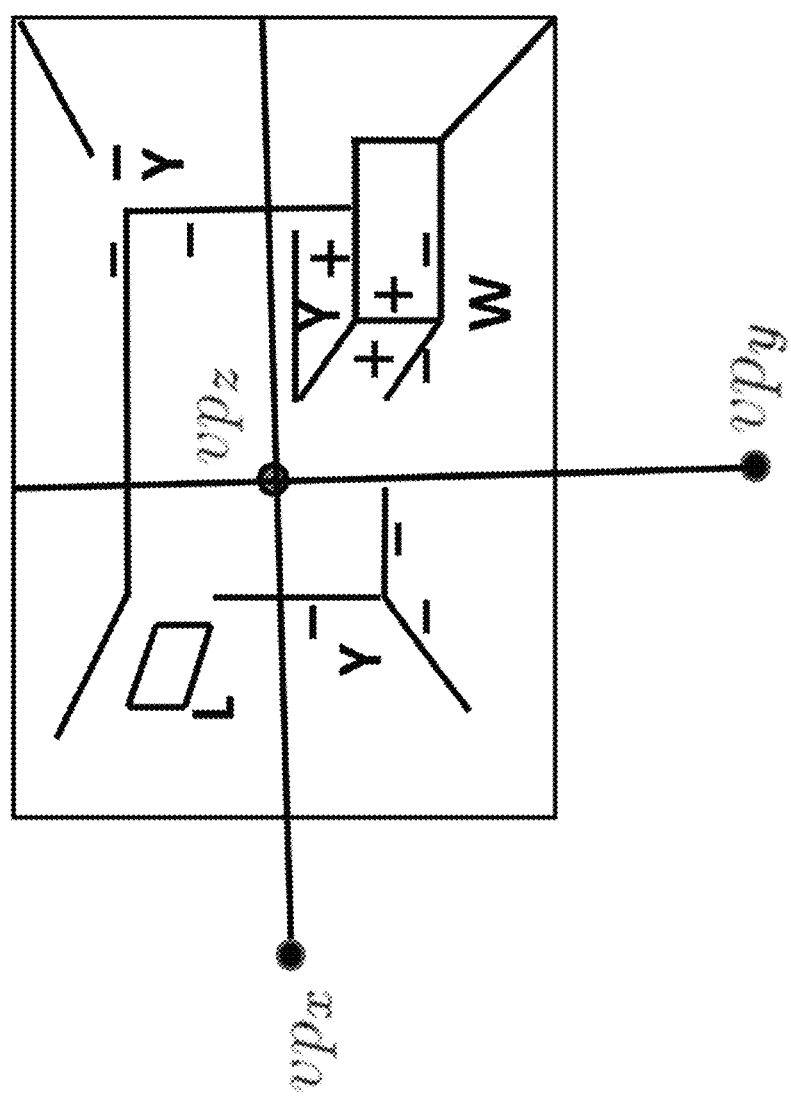
FIG. 3 is a line drawing of an indoor scene with missing; and occluded lines extracted from a real image.

FIG. 3 is a line drawing of an indoor 3D scene with detected lines. We consider a class of junctions that differ from conventional junctions. That is, we consider junctions formed by lines intersecting in three principal orthogonal directions, referred to as "Manhattan" junctions. We also consider junctions that lie on a single plane. For example, the L junction lies on a single plane. In the conventional labeling, this junction cannot be a L junction. The junctions defined by prior techniques do not consider junctions on a single plane. Thus "Manhattan" junctions we define in our work can also consider junctions on a single plane and thus our junctions are not a strict subset of conventional junctions. Manhattan junctions provide many advantages over the conventional junctions.

Figure 4A:
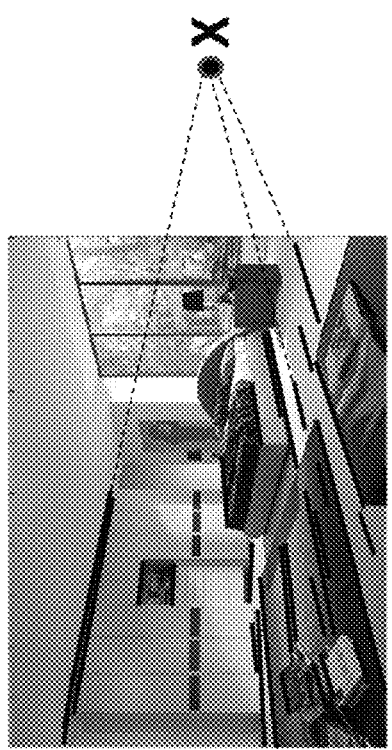
FIGS. 4A, 4B and 4C are images of a scene with three vanishing points according to embodiments of the invention.
Figure 4B:
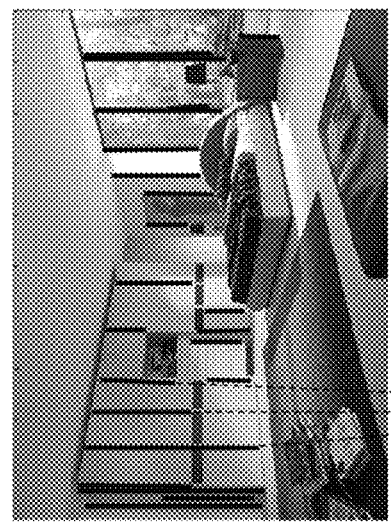
Figure 4C:
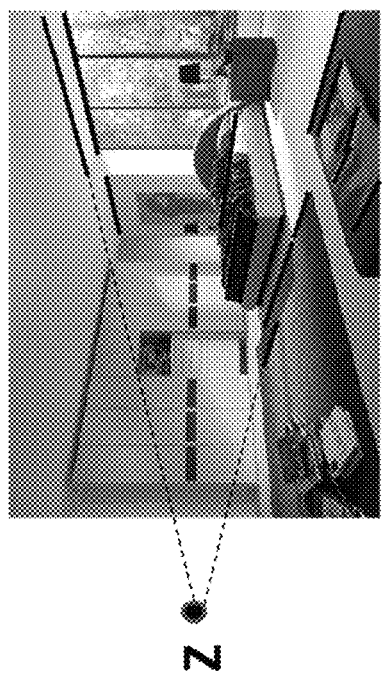

As shown in FIGS. 4A, 4B and 4C, we refer to the three X, Y, and Z vanishing points as $vp_x$, $vp_y$ and $vp_z$. In the case of Manhattan junctions, we can inter whether a junction is convex or concave without considering the neighboring junctions. In real world images, misclassification of junction types is possible. Therefore, we use the voting procedure.

Although we do not explicitly solve the problem of labeling the adjoining lines as convex, concave or occluding, our method implicitly uses this information to solve the layout estimation problem. While conventional approaches, such as used in analyzing computer-aided designs (CAD line drawings), junctions are subject to well known hard constraints in a constraint satisfaction procedure. In our real-world scenarios, we can only use the identified junctions as soft constraints in a probabilistic inference procedure for estimating the spatial layout of the scene.

Voting-Based Identification

In our voting procedure, each point (pixel) p is assigned a vote for a specific parameter in accumulators. The voting is designed such that maximum votes in the accumulators correspond to instances of objects or patterns that are to be detected. We identify the junctions using a two-stage procedure. First, we vote for six accumulators using only pixels on lines along the vanishing points. Second, we identify different types of junctions by applying a product operation to the contents of the six accumulators.

Voting

Each accumulator j stores the votes for a subset of pixels uniformly sampled from the image. We denote the votes at a specific point p in an accumulator $V_j(p)$, where $$j=\{\vec{x},\overleftarrow{x},\vec{y},\overleftarrow{y},\vec{z},\overleftarrow{z}\}.$$

For each point p, every line that is collinear with the line joining p and vpi, (i={x,y,z}) votes for either $$V_{\vec{i}}(p) \text{ or } V_{\overleftarrow{i}}(p)$$

depending on its location with respect to p and $vp_i$. If the line lies in the region between p and vpi, then the vote is for $$V_{\vec{i}}(p).$$

If the line lies outside of the region between p and $vp_i$, and not adjacent to $vp_i$, then the vote is for $$V_{\overleftarrow{i}}(p).$$

The vote is weighted by the length of the line. The assumption is that long lines are more indicative of real features than short spurious lines. The notation $\vec{i}$ refers to the lines towards the vanishing point $vp_i$, and the notation $\overleftarrow{i}$ refers to the lines away from the vanishing, point $vp_i$.

Figure 5A:
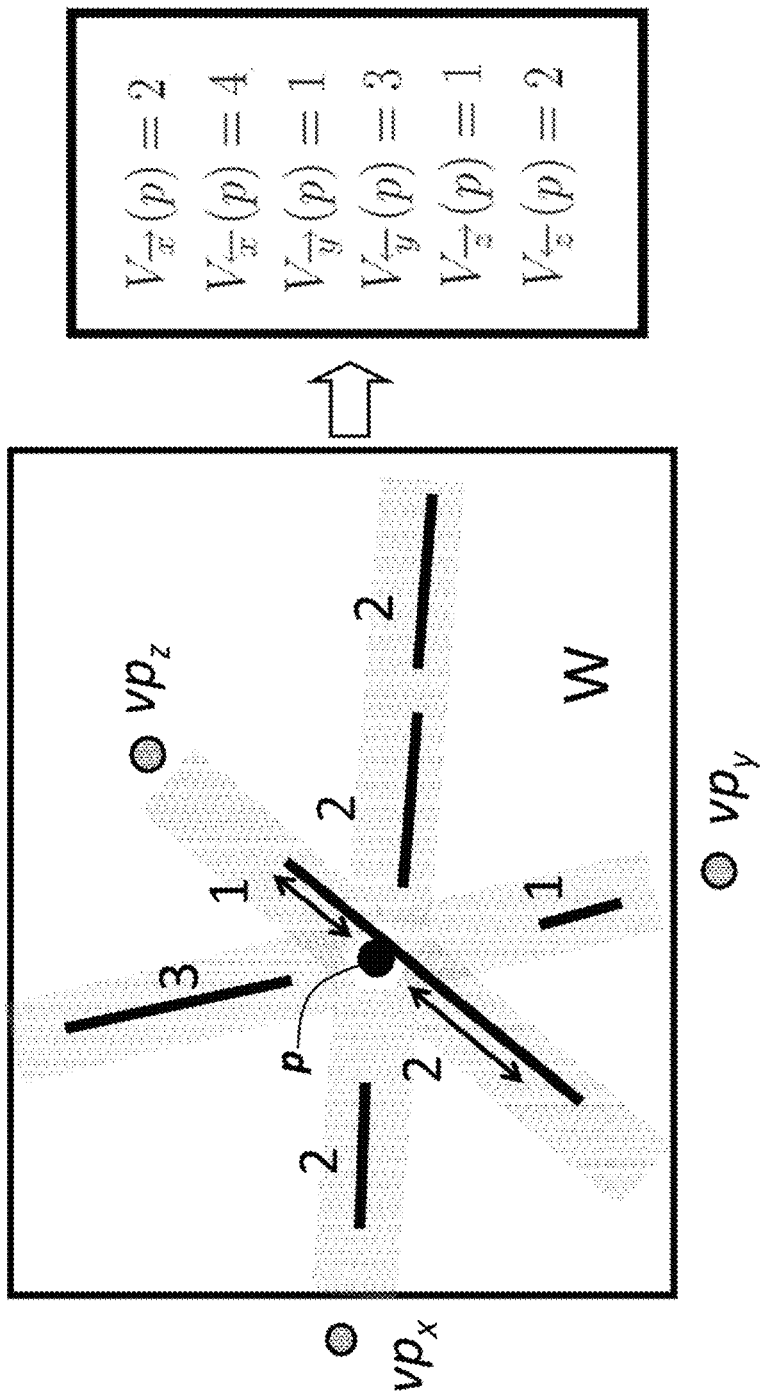
FIG. 5A is a schematic of a voting procedure for detecting junctions according to embodiments of the invention.

FIG. 5A shows example voting. Six accumulators store votes obtained from the six lines along the orthogonal directions. In this example, the contents of the accumulators corresponding to the pixel (point) p are $$V_{\vec{x}}(p)=2,$$

$$V_{\overleftarrow{x}}(p)=4, V_{\vec{y}}(p)=1, V_{\overleftarrow{y}}(p)=3, V_{\vec{z}}(p)=1, \text{ and}$$

$$V_{\overleftarrow{z}}(p)=2.$$

Junctions Identification

Using the six accumulators, we identify junctions using a product operation. At every point p, the corresponding six accumulators $V_j(p)$ indicate the presence of lines that are incident with the point.

As shown in FIG. 5B, the different junctions correspond to different subsets of these six elements. To identify a junction, we ensure that there are lines in specific directions, and we also need to ensure a geometric constraint that there are no lines in the other directions. In other words, for the point p, some accumulators are non-zeros, and the others are zeros. This is a key insight in our method to successfully identify junctions.

We define $$S=\{\vec{x},\overleftarrow{x},\vec{y},\overleftarrow{y},\vec{z},\overleftarrow{z}\}.$$

We denote every junction type as JA where $A \subseteq S$. For a point p and a junction type $J_A$, we determine the following voting function:

$$f(p,A) = \prod_{i \in A} V_i(p) \prod_{j \in S \setminus A} \delta(V_j(p)) \quad (1)$$

where δ(g) is a Dirac delta function that is 1 when g=0, and 0 for all other values of g. If f(p,A) is non-zero, then we identify it junction at point p of type $J_A$.

Figure 6:
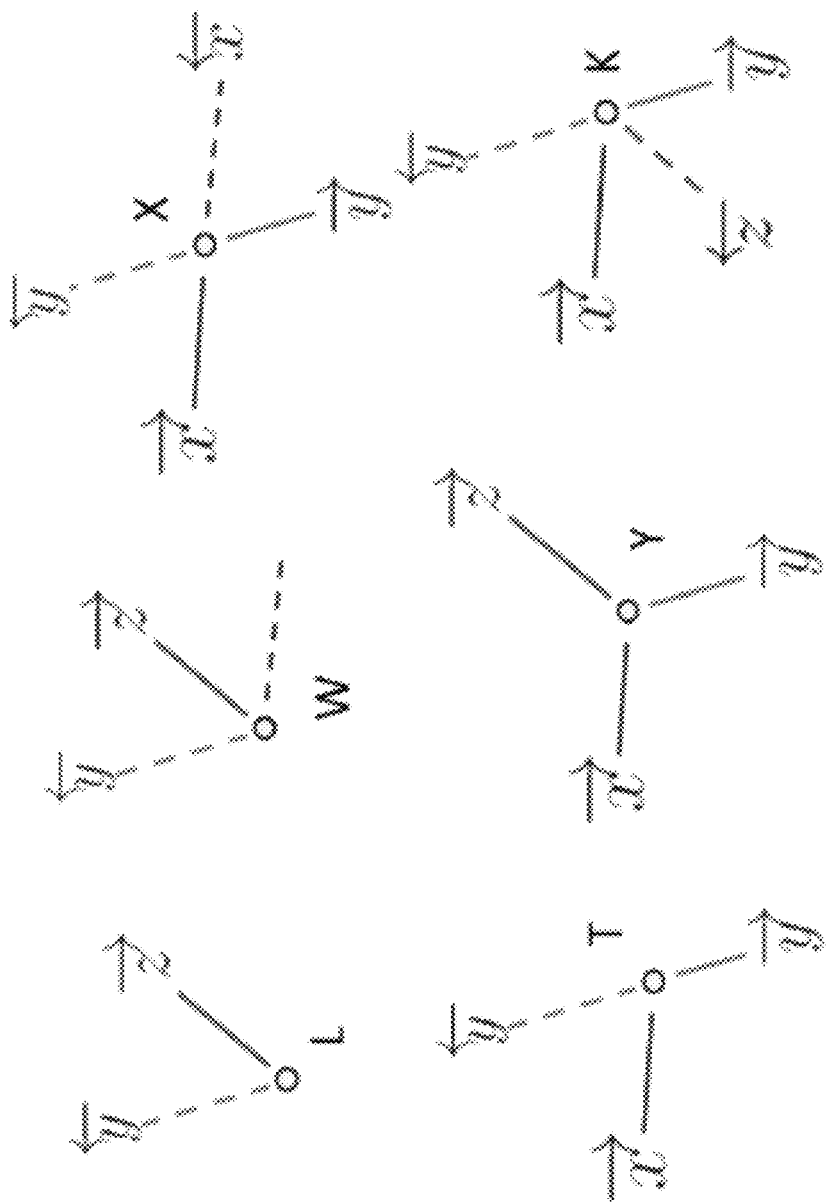
FIG. 6 is a schematic of junction types according to embodiments of the invention.

FIG. 6 shows examples of for different junctions of K, L, T, W, X and Y. There are 26 possible junctions. However, some of those junctions are not useful. For example, any "junctions" that are just points on a line. Our junctions are constrained to be Manhattan (orthogonal) junctions. The configuration of the junctions conform to the capital letters. W-junctions are common on the floor. Y-junctions are distributed equally as they are more common on the boundaries and corners and have high scores. L, T and X correspond to planar regions, and are distributed depending on their orientations.

Manhattan or Orthogonal Junctions

Our orthogonal junctions are formally defined as follows. Let the minimum angle between two lines $l_i$ and $l_j$ be $\theta(l_i,l_j)$. The different junction types at a pixel p are defined as follows:

L-junction: From an image pixel p, we have two lines along two different vanishing points.

W-junction: From an image pixel p, we have three lines $l_1$, $l_2$, and $l_3$ that are along three different vanishing points and satisfy $\theta(l_1,l_2)+\theta(l_2,l_3)<180°$.

X-junction: From an image pixel p, we have four lines, where two of the lines are along one vanishing point and the other two lines are along another vanishing point.

T-junction: From an image pixel p, we have three lines, where two lines are along one vanishing point and the other line is along a different vanishing point.

Y-junction: From an image pixel p, we have three lines $l_1$, $l_2$, and $l_3$, where all three lines are along three different vanishing points and satisfy $\theta(l_1,l_2)+\theta(l_2,l_3)<180°$.

K-junction: From an image pixel p, we have four lines $l_1$, $l_2$, $l_3$ and $l_4$, where $l_1$ and $l_4$ are along one vanishing point and $l_1$, $l_2$ and $l_3$ are along three different vanishing points and satisfy $\theta(l_1, l_2)+\theta(l_2, l_3)+\theta(l_3, l_4)<180°$.

Inference

We use a structured SVM for training the energy function that is used for evaluating the possible layouts and identifying the optimal layout. We use two ideas in the inference procedure that are important for the performance of our method. First, we use junction-based sampling for generating possible layouts. Second, we use the energy function based on the conditional random field (CRF) model. The energy function determines costs in terms of energy required for a particular layout. Maximizing the energy function enables us to estimate the optimal layout.

Junction-Based Sampling

FIGS. 7A, 7B and 7C show the concepts of our junction-based sampling of layouts where only pixels in the 2D image along, lines to the junctions are sampled. As shown in FIG. 7A, by sampling, two horizontal rays passing through $vp_x$ and two vertical rays passing through $vp_y$, we can generate a possible layout where the five faces correspond to left wall, ceiling, middle wall, floor and right wall. As shown in FIG. 7B, the image is partitioned into four quadrants based on the positions of the three vanishing points. Each corner of the room, if visible in the image, can only appear in one of the quadrants and is associated with a specific subtype of Y junctions. For each of these quadrants, we store the identified Y junctions. Given a regular sampling, as shown in FIG. 7C, we identify high scoring Y junctions in the cone spanned by two consecutive rays. These high scoring Y junctions are used to generate a new set of rays to sample the layouts. Although we use a very small number of samples, we can still generate possible layouts that are close to the actual layouts.

By sampling two horizontal rays ($y_1$ and $y_2$) passing through $vp_x$ and two vertical rays ($y_3$ and $y_4$) passing through $vp_z$ as shown in FIG. 7A, we can generate different layouts. We use a sampling that respects constraints on the identified junctions. This allows us to partition the image into the four quadrants based on the positions of the three vanishing points. Note that in some images, one or more of these quadrants can be outside image boundaries. The four corners of the cuboid model satisfy the property that each corner lies in only one of these quadrants. These corners are Y junctions.

In each of these quadrants, we identify the Corresponding Y junctions. We start with a uniform sampling and between every pair of adjacent rays, we identify the Y junction with a maximal score given by Equation (1). These junctions are used to obtain a new set of rays. This data dependent sampling enables us to identify possible layouts that are close to the true layouts while still using a coarse sampling.

Evaluating Possible Layouts Using a CRF Model

Given training images $\{d_1, d_2, \ldots, d_n\} \in D_{139}$ and corresponding layouts $\{l_1, l_2, \ldots, l_n\} \in L$, we learn a mapping to $g:D,L \to R$ identify the optimal layout. Here $l_i=\{y_1,y_2,y_3,y_4\}$, where $y_i$ corresponds to the rays used in generating the layout as shown in FIG. 7A.

We learn the mapping in such a manner that for the correct combination of the image d and its true layout $l_1$, the output of the function $g(d,l_i)$ is large. We also ensure that for any layout l that is not the true layout, $g(d,l)$ decreases as the deviation between the layouts $\Delta(l,l_i)$ increases. Usually, the function g is of the form $g(d,l)=w^T\psi(d,l)$, where w is a parameter vector that we learn, and $\psi(d,l)$ is a vector of features that can be determined from the image d and the layout l. The mapping function can be learned discriminatively using a quadratic program formulated by structure learning techniques.

We use the CRF model to score and evaluate each possible layout using the energy function. Usually, learning parameters of an energy function based on the CRF model is non-trivial for non-submodular functions, which, are intractable. However, our layout estimation problem is different from other computer vision problems, such as image segmentation, or stereo vision. The geometric constraints imposed by our vanishing points significantly reduce the solution space.

However, we do not use conventional approaches, such as graph cuts or message passing to do the inference. Instead, we exhaustively generate possible layouts and determine the optimal layout based on the energy function. Furthermore, the use of junctions provides data dependent sampling, enabling us to use a coarse sampling. By taking advantage of the finite solution space, which is rare in vision problems, our CRF-based energy function is not restricted to submodularity or pairwise potentials.

Figure 8A:
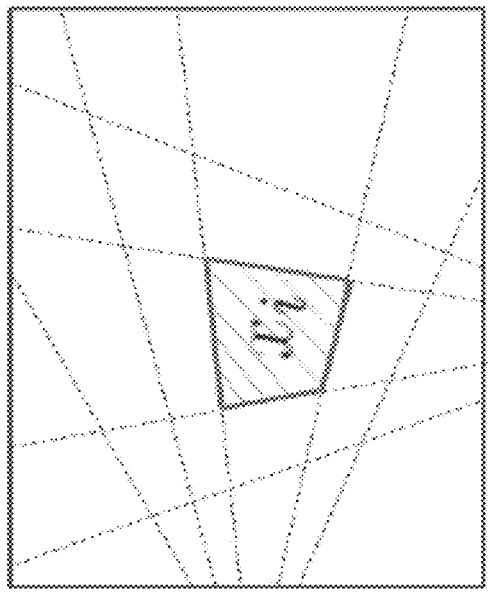
FIGS. 8A, 8B and 8C are schematics of a CRF graph using rays for generating possible layouts according to embodiments of the invention.

FIG. 8A shows how we construct our CRF graph using the rays that are used for generating possible layouts. Given the rays used for sampling the layouts, we partition the image space into a set of polygons. Each polygon corresponds to a node $x_i$ in the CRF. Each node has five labels {left (L), middle (M), right (R), floor (F), ceiling (C)}, which correspond to the five faces of the room.

Figure 8B:
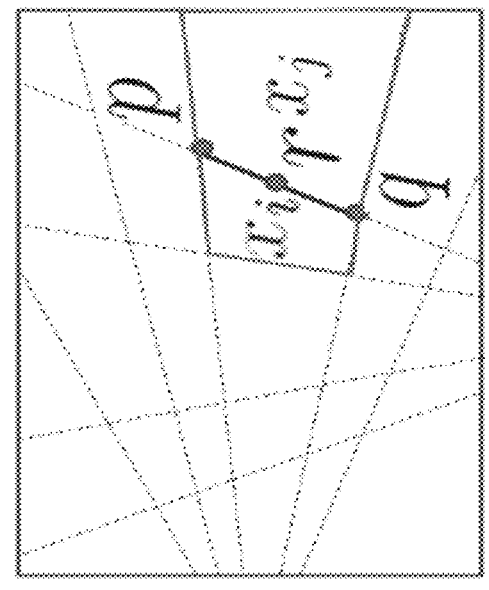

As shown in FIG. 8B, two nodes $x_1$ and $y_j$ are adjacent when the nodes share a line pq. Our pairwise potentials in the CRF can be determined based on the presence of a line in the image that coincides with pq or specific identified junctions at a point r on the line pq.

Figure 8C:
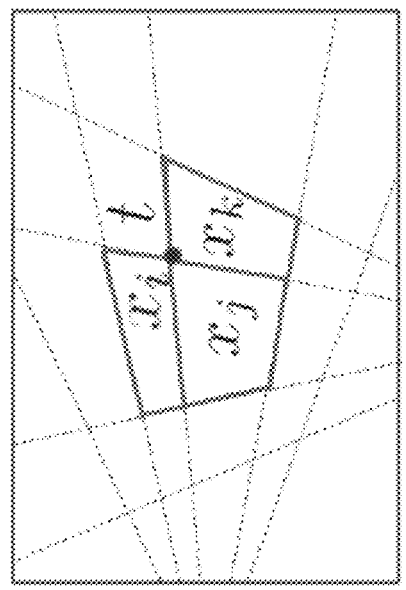

As shown in FIG. 8C, corners of a true layout usually coincide with specific Y junctions. If t is identified as a Y junction, then we incorporate this prior information in the form of a triple clique in the incident nodes $x_i$, $x_j$ and $x_k$.

Specifically, the rays partition the image space into several polygons. Our vertex set is given by $x=\{x_1, x_2, \ldots, x_n\}$, where $x_i$ is a node corresponding to a polygon in the image. The set of edges is $\{i,j\} \in E$ when the nodes $x_i$ and $x_j$ share a line. Each possible layout can be parameterized by four rays $y=\{y_1,y_2,y_3,y_4\}$ where $y_i=\{1, 2, \ldots, k\}$ and k corresponds to the number of samples used.

In our CRF graph, every node $x_i=\{L, M, R, F, C\}$, which corresponds to the five faces given by left wall (L), middle wall (M), right wall (R), floor (F) and ceiling (C). Given y, we can determine the corresponding x, and from x we can similarly determine y. At the boundaries, a node $x_i$ in the CRF graph can correspond to two regions given by the rays y. In such cases, the node $x_i$ takes the label corresponding to the face that covers maximum area in the polygon. The CRF model is expressed as a third order energy function E, which involves variables, features and parameters, of the following form with unary, pairwise and triple clique terms:

$$E(x, \omega) = \sum_{i=1}^{n} \omega_i \Psi(i, a)\delta_{ia} + \sum_{\{i,j\} \in E} \omega_{i,j} \Psi(i, j, a, b)\delta_{ia}\delta_{jb} + \sum_{\{i,j,k\} \in T} \omega_{i,j,k} \Psi(i, j, k, a, b, c)\delta_{ia}\delta_{jb}\delta_{kc}, \quad (2)$$

$$i, j, k = \{1, 2, \ldots, n\} \; a, b, c = \{L, M, R, F, C\}$$

where we denote unary potentials by $\Psi(i,a)$, pairwise potentials by $\Psi(i,j,a,b)$, and triple cliques by $\Psi(i,j,k,a,b,c)$. These potentials correspond to features in the energy function that are computed using junctions. The unary potential corresponds to the cost added to the function when $x_i=a$. The pairwise term denotes the cost when $x_i=a$ and $x_j=b$. In the same manner, the triple clique denotes the cost when three variables take specific labels. T is a set of triplets $\{i,j,k\}$ representing incident nodes corresponding to high scoring junctions, as shown in FIG. 8C.

The function $\delta_{ia}$ is a Kronecker delta function that is 1 when $x_i=a$ and 0 otherwise. The parameter we learn in this energy function is $\omega=\{\omega_i,\omega_{ij},\omega_{ijk}\}$, winch is determined from the training data. We construct the potentials using soft constraints on junctions that are normally observed in indoor and outdoor scenes as follows.

Unary Potentials

We use L, T, and X junctions to construct the unary terms. For every node $x_i$ we determine the cumulative sum of all the junctions of specific types that are identified inside the polygon. For every face, we take into account the orientation of the lace. For example, the middle wall gets the junction scores from only junctions that span on the Z plane. This can be determined using masks on the accumulators that store the junction scores.

Pairwise Potentials

FIG. 8B shows two adjacent nodes $x_i$ and $x_j$ sharing a line pq. If there is a point r on the line pq corresponding to specific Y or W junctions, then we encourage the nodes $x_i$ and $x_j$ to take different labels. We use the junction scores of Y and W junctions on the line pq as the pairwise potentials. We also use an additional pairwise potential that comes from the original lines in the image.

We separate $x_i$ and $x_j$ into two faces when there is a line in the image that coincides with pq. This can be obtained directly from the difference of the accumulator cells we constructed for identifying junctions. In the example shown in FIG. 8B, the difference $V_{\vec{y}}(p)-V_{\vec{y}}(q)$ gives the length of the overlap of any line in the image with the line pq Triple Clique Potentials FIG. 8C shows a point r that is incident with three nodes $x_i$, $x_j$ and $x_k$. If this point is identified as a Y junction that corresponds to a corner as shown in FIG. 7B, then we assign a higher score for a layout that is incident with this point. Thus, if a Y junction coincides with r, we use its junction score as a triple clique potential on the three incident nodes. By putting prior probabilities on three incident nodes, we can encourage the layout to pass through the incident point.

After we have the unary, pairwise and triple clique potentials, our energy function in Equation (2) can also be expressed as $E(x,\omega))=\omega^T\Phi(\Psi,x)$, where $\Phi(\Psi,x)$ is a linear vector that can be determined from x and $\Psi$. We can learn the weight parameter $\omega$ using the structured SVM.

Applications

Figure 9:
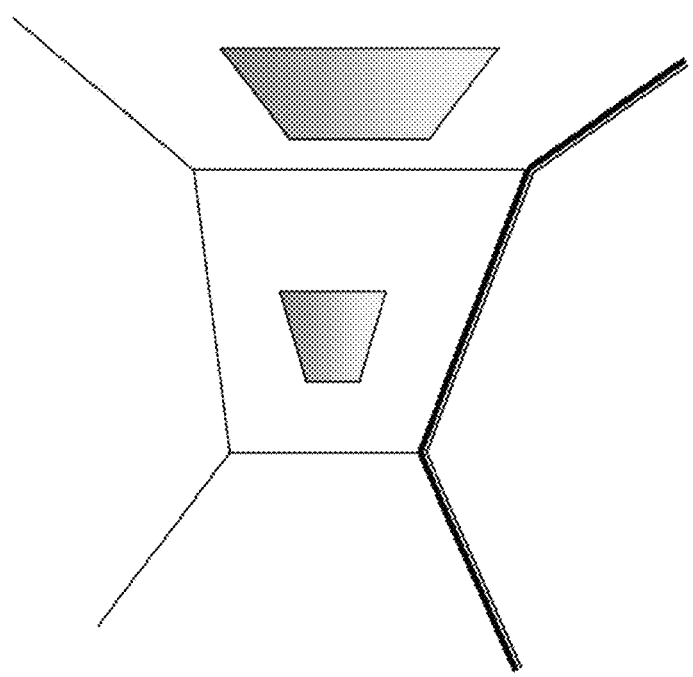
FIG. 9 is a block, diagram of a climate control system according to embodiments of the invention.
Figure 9:
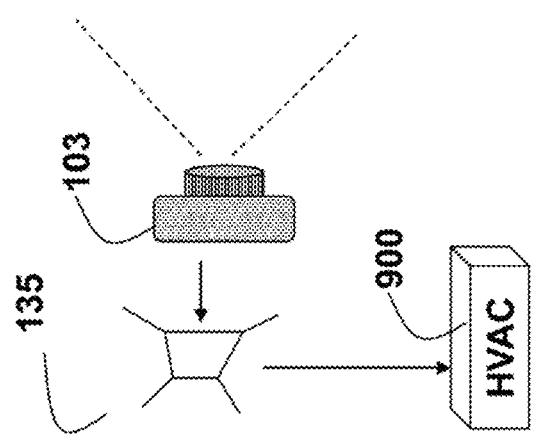

As shown in FIG. 9, the scene reconstruction can be used in a number of applications. For example, the camera is mounted on or near household appliances at a known height for obtaining an optimal room geometry, e.g., the actual physical volume of the room in terms of the cuboid layout. In a surveillance application, the optimal layout is used to provide boundary conditions for tracking people in the scene. The layout can also be used to optimally align entertainment units such as televisions, and sound equipment in the room. The room layout can be used to guide robotic cleaning equipment via wireless communication.

Additionally, room geometry can be used to determine one or more feedback gains for a room air conditioner or a heat pinup in the following manner. Consider a vapor compression system configured to remove heat from a space. In many types of vapor compression machines, and especially ones with variable speed actuators (variable speed compressors and fans), the commands sent to the actuators are determined from a feedback controller. When the feedback gains are too low, the actuators move slowly, and therefore the room temperature responds slowly to changes in the thermostat setpoint. When the feedback gains are too high, the actuators may overreact to changes in setpoint, causing the room to become over-cooled. This over-cooled room may be uncomfortable, and may even cause the air conditioner to switch into heating mode (on systems where such a feature is available), leading to a limit cycle where the air conditioner switches between cooling and heating modes.

Therefore, it is desirable to select feedback gains that balance the tradeoff between a slow responding but stable room temperature response, and a fast but limit cycle-inducing response. Traditionally, because the size of the room in which the air conditioner is deployed is not known by the manufacturer a priori, a conservative set of feedback gains is typically selected that is stable for all anticipated room sizes.

However, using the single view reconstruction algorithm, an estimate of the actual physical volume of air in a room can be obtained. Since the room temperature response depends on the volume of air in the room interacting with the air conditioner, an appropriate set of feedback gains can be selected that have been previously determined to provide optimal fast room temperature response, while still preserving stability. Further, the aspect ratio of the room determined directly from the cuboid layout may also be used to refine the selection, for example to select appropriate gains in the case of a long, narrow room or hallway where the air conditioner may only interact with air immediately in its vicinity and can therefore safely select larger gains.

If the camera 103 is on or near an outlet of a heating, ventilation and air-conditioning unit 900, the optimal flow rate of air to enter the room can be determined.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for reconstructing a scene from a single two-dimensional (2D) image, wherein the scene is a three-dimensional (3D) real-world scene, comprising the steps of:

identifying, using pixels in the single two-dimensional (2D) image, junctions satisfying geometric constraints of the scene based on intersecting lines, vanishing points and vanishing lines that are orthogonal to each other, and wherein the junctions are Manhattan junctions, wherein the Manhattan junctions are identified by a voting procedure including obtaining six votes for each pixel in the single two-dimensional (2D) image based on line segments in six directions (+x, =x, +y, −y, +z and −z) along three vanishing points, each vote being a whole number, such that each pixel is classified as a junction based upon a presence of two or more positive integers out of the six votes;

generating possible layouts of the scene by sampling the 2D image according to the junctions, wherein the scene includes clutter; and maximizing an energy function to select an optimal layout from the possible layouts wherein the energy function uses a conditional random field (CRF) model with the geometric constraints to evaluate the possible layouts, and wherein the steps are performed in a processor.

2. The method of claim 1, wherein the scene is indoors or outdoors.

3. The method of claim 1, wherein the geometric constraints include an ordering constraint, a connectivity constraint, a vanishing point constraint, and a coplanarity constraint.

4. The method of claim 1, wherein the Manhattan junctions are identified by junctions formed by lines intersecting in three orthogonal directions and are junctions that lie on a single plane.

5. The method of claim 1, wherein arrangements of the lines of the junctions conform to capital letters K, L, T, W, X and Y.

6. The method of claim 1, wherein the CRF model includes a graph where the nodes are derived from junctions and adjacent lines are edges constructed from the junctions.

7. The method of claim 6, wherein the CRF model is expressed as a third order energy function involves variables, features and parameters.

8. The method of claim 7, wherein the variables are nodes x, in the graph that take labels {L, M, R, F, C} which corresponds to a left wall (L), a middle wall (M), a right wall (R), a floor (F) and a ceiling (C).

9. The method of claim 7, wherein the features are determined from L, T, W, X and Y junctions.

10. The method of claim 7, wherein the parameters of the energy function are trained using training images and a structured support vector machine (SVM).

11. The method of claim 4, wherein votes are weighted by lengths of the lines.

12. The method of claim 1, wherein the possible layouts are generated by sampling pixels in the 2D image along on lines passing through the junctions.

13. The method of claim 1, wherein a camera is mounted on a household appliance for obtaining an optimal room geometry.

14. The method of claim 1, wherein the optimal layout is used to provide boundary conditions for tracking people in a surveillance application.

15. The method of claim 13, wherein the optimal layout is used to align the camera mounted an entertainment unit according to the optimal room geometry.

16. The method of claim 1, wherein the optimal layout is used to guide a vacuum cleaning robot using wireless communication.

17. The method of claim 1, wherein a camera is on or near an outlet of a heating, ventilation and air-conditioning unit in a room to determine an optimal flow rate of air entering the room.

18. The method of claim 17, wherein a height of the camera is used to determine an actual physical volume of the room from a cuboid layout for the room.

19. The method of claim 18, wherein the actual physical volume of the room is used to determine one or more feedback gains for a room air conditioner or heat pump.

20. The method of claim 18, wherein the volume and an aspect ratio is determined directly from the cuboid layout to determine one or more feedback gains for the room air conditioner or the heat pump.

21. A data processing system to provide reconstructing of a scene from a single two-dimensional (2D) image, wherein the scene is a three-dimensional (3D) real-world scene, the system comprising:

a data storage memory unit having stored therein information regarding geometric constraints for pixel-level classification;

a processor, coupled to the data storage memory unit, that is configured to:

identify junctions satisfying geometric constraints of the scene based on intersecting lines, vanishing points and vanishing lines that are orthogonal to each other, and wherein the junctions are Manhattan junctions, wherein the Manhattan junctions are identified by a voting procedure including obtaining six votes for each pixel in the single two-dimensional (2D) image based on line segments in six directions (+x, −x, +y, −y, +z and −z) along three vanishing points, each vote being a whole number, such that each pixel is classified as a junction based upon a presence of two or more positive integers out of the six votes;

generate possible layouts of the scene by sampling the 2D image according to the junctions, wherein the scene includes clutter; and maximize an energy function to select an optimal layout from the possible layouts, wherein the energy function uses a conditional random field (CRF) model with the geometric constraints to evaluate the possible layouts.

\* \* \* \* \*